United States Patent
Jego Stora

(10) Patent No.: US 7,214,735 B2
(45) Date of Patent: May 8, 2007

(54) MICROSPHERE-FILLED SEALANT MATERIALS

(75) Inventor: Carole Jego Stora, Cedex (FR)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/770,095

(22) Filed: Feb. 2, 2004

(65) Prior Publication Data

US 2005/0167431 A1    Aug. 4, 2005

(51) Int. Cl.
*C08L 83/04* (2006.01)

(52) U.S. Cl. ............. 524/588; 528/31; 528/32; 525/478

(58) Field of Classification Search ............. 528/31, 528/32, 21; 524/588; 525/478
See application file for complete search history.

(56) References Cited

U.S. PATENT DOCUMENTS

| | | | |
|---|---|---|---|
| 4,451,696 A | 5/1984 | Beinhaur | |
| 4,610,738 A | 9/1986 | Jervis | |
| 4,777,063 A * | 10/1988 | Dubrow et al. | 427/503 |
| 4,840,974 A | 6/1989 | Gross et al. | |
| 5,079,300 A | 1/1992 | Dubrow et al. | |
| 5,099,088 A | 3/1992 | Usami et al. | |
| 5,252,627 A | 10/1993 | Bauman et al. | |
| 5,310,075 A | 5/1994 | Wyler | |
| 5,397,859 A | 3/1995 | Robertson et al. | |
| 5,529,508 A * | 6/1996 | Chiotis et al. | 439/204 |
| 5,828,005 A | 10/1998 | Huynh-Ba et al. | |
| 6,010,134 A | 1/2000 | Katoh | |
| 6,169,250 B1 | 1/2001 | Bolcato | |
| 6,194,476 B1 * | 2/2001 | De Ridder et al. | 521/54 |
| 6,274,648 B1 | 8/2001 | Meguriya et al. | |
| 2001/0016609 A1 | 8/2001 | Meguriya et al. | |
| 2002/0188059 A1 | 12/2002 | Takayoshi | |
| 2004/0238201 A1 | 12/2004 | Asakura et al. | |

FOREIGN PATENT DOCUMENTS

| | | |
|---|---|---|
| EP | 0 233 417 | 8/1987 |
| EP | 0 409 444 A2 | 1/1991 |
| EP | 0 212 829 B1 | 10/1994 |
| EP | 0 328 386 B1 | 11/1994 |
| EP | 0733672 | 9/1996 |
| EP | 0 736 215 B1 | 10/1998 |
| EP | 0971369 | 1/2000 |
| EP | 0 821 027 B1 | 11/2001 |
| FR | 2 770 048 | 4/1999 |
| JP | 63191841 A | 8/1988 |
| JP | 63-280766 * | 11/1988 |
| JP | 04173867 A | 6/1992 |
| WO | WO 97/27655 | 7/1997 |
| WO | WO 00/49697 | 8/2000 |

OTHER PUBLICATIONS

Search Report for International Application No. PCT/US2005/000106, mailed on Jun. 16, 2005 (7 pages).

* cited by examiner

*Primary Examiner*—Kuo-Liang Peng
(74) *Attorney, Agent, or Firm*—John A. Burtis

(57) ABSTRACT

The present invention includes a method of sealing an enclosable container, the method entails positioning a sealant material within the enclosable container, and closing the enclosable container to compress the sealant material. The sealant material includes a silicone gel, a microsphere filler, and optionally, a silica filler.

26 Claims, 2 Drawing Sheets

MICROSPHERE-FILLED SEALANT MATERIALS

CROSS REFERENCE OF RELATED APPLICATION

The present invention is related to U.S. patent application Ser. No. 10/770,377, entitled RE-ENTERABLE SPLICE ENCLOSURE, filed on an even date herewith.

FIELD

The present invention relates to enclosable containers incorporating sealant materials. More particularly, the present invention relates to enclosable containers incorporating microsphere-filled sealant materials that retain elasticity when used in compressive environments.

BACKGROUND

Conventional sealant materials are used with a variety of applications that require moldability and resistance to moisture and weathering. Generally, sealant materials may be formed by curing a mixture of siloxane-based polymers in the presence of a catalyst. The pre-cured mixtures are generally flowable, and may be poured into molds to create pre-formed sealant materials. Alternatively, the pre-cured mixtures may be poured directly into cavities of intended structures to create sealant materials that conform to the individual dimensions of the structures.

After curing, solidified sealant materials with varying degrees of elasticity may be obtained. Elasticity of the cured sealant materials depends upon a variety of factors, such as types and concentrations of siloxane-based polymers and additives, and the extent of the cross-linking. Typically, sealant materials exhibit adequate levels of elasticity to, at least initially, provide seals against moisture. However, it is known that such existing sealant materials exhibit poor mechanical properties (i.e., low tensile strength and elongation at break) that limits the use of the sealant materials in compressive environments. This may be overcome by adding silica fillers, such as fumed silica, to the sealant materials prior to curing. Upon curing, the fillers have been found to improve the mechanical properties of sealant materials.

SUMMARY

Unfortunately, the addition of silica fillers has also been found to decrease the elasticity of the sealant materials. This prevents the sealant materials from expanding back to the original dimensions after being subjected to compressive forces over periods of time. Eventually, such reductions in elasticity cause the sealant materials to recess from the original dimensions and leave gaps in the structure to be sealed. This correspondingly limits the useful life of the sealant materials. There is a need for a sealant material that exhibits good mechanical properties and retains elasticity when used in compressive environments.

The present invention relates to a method of sealing an enclosable container, which includes positioning a sealant material within the enclosable container, and closing the enclosable container to compress the sealant material. The sealant material contains a silicone gel and a microsphere filler, exhibits good mechanical properties and retains elasticity when used in compressive environments. The sealant material may further contain a silica filler. The sealant material of the present invention may also be used to shroud a component that extends out of the enclosable container.

While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale. Like reference numbers have been used throughout the figures to denote like parts.

DETAILED DESCRIPTION

Figure 1:
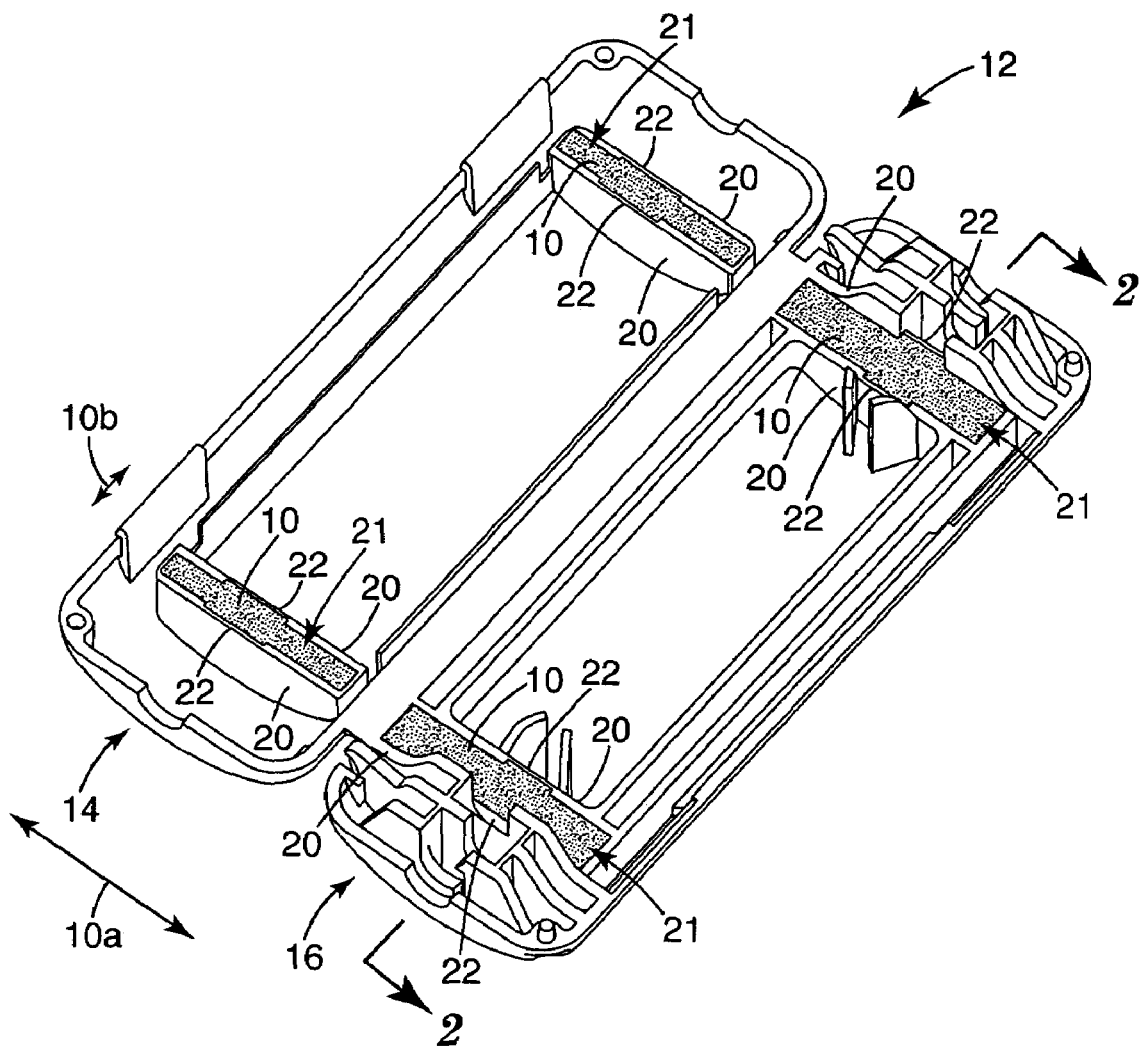
FIG. 1 is a perspective view of a sealant material in use with a cable box pursuant to the present invention.

The present invention encompasses the use of a sealant material, depicted as a sealant material 10 in FIG. 1, in combination with enclosable containers, where the sealant material 10 exhibits good mechanical properties and retains elasticity in compressive environments. In a first embodiment, the sealant material 10 includes a silicone gel blended with a microsphere filler. The addition of the microsphere filler to the silicone gel increases the elasticity of the sealant material 10 compared to a similar silicone gel that is not filled. This is believed to be attributable to the flexibility of the microsphere filler.

All concentrations herein are expressed in weight percent, unless otherwise stated. Additionally, all amounts are expressed on a weight basis, unless otherwise stated. The silicone gel may be present in the sealant material 10 in an effective amount of about 90.0% to about 99.5%. Correspondingly, the microsphere filler may be present in the sealant material 10 in an effective amount of about 0.5% to about 10.0%. A particularly suitable composition includes about 98.0% silicone gel and about 2.0% microsphere filler.

In a second embodiment, the sealant material 10 may alternatively include a silicone gel blended with both a microsphere filler and a silica filler. The addition of the silica filler improves the mechanical properties of the sealant material 10. However, as previously discussed, incorporation of silica fillers tends to decrease the elasticity of sealant materials. Nonetheless, the addition of the microsphere filler counters the elasticity reduction caused by the silica filler. In fact, following compressive aging, the sealant material 10 that incorporates the microsphere filler and the silica filler exhibits greater elasticity than the silicone gel that is not filled.

When the microsphere filler and the silica filler are included in the sealant material 10, the silicone gel may be present in the sealant material 10 in an effective amount of about 70.0% to about 98.5%, based upon the total weight of the sealant material 10. The microsphere filler may be present in the sealant material 10 in an effective amount of about 0.5% to about 10.0%, based upon the total weight of the sealant material 10. Correspondingly, silica filler may be present in the sealant material 10 in an effective amount of about 1.0% to about 20.0%, based upon the total weight of the sealant material 10. A particularly suitable composition for the sealant material 10 includes about 93.0% silicone gel, about 2.0% microsphere filler, and about 5.0% silica filler, based upon the total weight of the sealant material 10.

In both embodiments, the silicone gel may include a silicone oil, a vinyl siloxane, a hydrosiloxane, a reaction inhibitor, and a catalyst. Suitable substances for these components are provided below. Suitable concentrations for these components, based upon the total weight of the silicone gel, include about 50.0% to about 95.0% silicone oil, about 5.0% to about 50.0% vinyl siloxane, and about 0.01% to about 10.0% hydrosiloxane. Particularly suitable concentrations include about 60.0% to about 85.0% silicone oil, about 10.0% to about 40.0% vinyl siloxane, and about 0.5% to about 6.0% hydrosiloxane. The reaction inhibitor may be present in the silicone gel in an appropriate concentration to prevent premature curing of the silicone gel. As such, the reaction inhibitor may be present in the silicone gel in an effective amount of about 1 parts-per-million by weight (ppm) to about 40 ppm. Similarly, the catalyst may be present in the silicone gel in an appropriate concentration to cure the sealant material 10, and may be present in the silicone gel in an effective amount of about 1 ppm to about 10 ppm.

The sealant material 10 may be formed via addition curing a two-part system (Parts A and B). The silicone oil and the vinyl siloxane are preferably included in about equal amounts in both Parts A and B. However, exact ratios in Part A versus Part B are not critical. The catalyst and reaction inhibitor may then be mixed into Part A, and the hydrosiloxane may be mixed into Part B. Finally, the filler materials may be included in equal amounts to both Parts A and B. The two parts (Parts A and B) are then mixed together in one-to-one ratio to form and addition cure the sealant material 10.

Due to the exothermic nature of the addition curing, the reaction may take place at room temperature without adding additional heat. This is beneficial because high levels of heat may cause the microsphere filler to expand. Such expansion induces stress on the microsphere filler particles, which may eventually lead to unwanted cracking of the microsphere filler particles. At room temperature, the sealant material 10 typically gels within about 2–3 minutes. However, to ensure a more complete cure, the sealant material 10 may be allowed sit for about eighteen hours. Also, elevated temperatures may be used to decrease the curing time.

The enclosable containers that may be used in combination with the sealant material 10 pursuant to the present invention may include structures capable of compressing the sealant materials 10 contained therein, where the compressed sealant materials 10 form seals against moisture and other environmental conditions. Preferably, the enclosable containers may be reopened and resealed, as well. A variety of enclosable containers are suitable for use in the present invention, such as circuitry enclosures, telecommunications boxes, and gasket enclosures.

FIG. 1 includes a perspective view of a cable box 12, which is an example of a particularly suitable enclosable container for use in the present invention. The cable box 12 is further described in the co-pending patent application filed on even date, entitled "Re-Enterable Splice Enclosure", and which is incorporated herein by reference in its entirety. The cable box 12 includes matable cover members 14, 16, which are capable of being placed against each other to enclose the internal portions of the cable box 12. The cover members 14, 16 each include surfaces 20 that define a pair of containment cavities 21 located at distal ends of both the cover members 14, 16. A fluid form of the sealant material 10 may be poured into the containment cavities 21 and cured insitu. Alternatively, the sealant materials 10 may be may be pre-molded to create pre-shaped pieces, which are subsequently inserted into the containment cavities 21. While the dimensions of the sealant materials 10 upon curing may vary, each sealant material 10 has a length in the direction of a vector 10a and a width in the direction of a vector 10b. Accordingly, each sealant material 10 has an exposed-surface area defined by the length 10a and the width 10b of the particular sealant material 10.

The cable box 12 may also contain additional containment cavities 21 (not shown) that accept the sealant material 10 at other locations within the cover members 14, 16. The cover members 14, 16 each include wall portions 22. The wall portions 22 are typically relatively thin in cross section and provide lateral support for the sealant materials 10 located in containment cavities 21. Additionally, because of the thin dimensions, the wall portions 22 are deformable and allow insertion of a component between cover members 14, 16.

Figure 2:
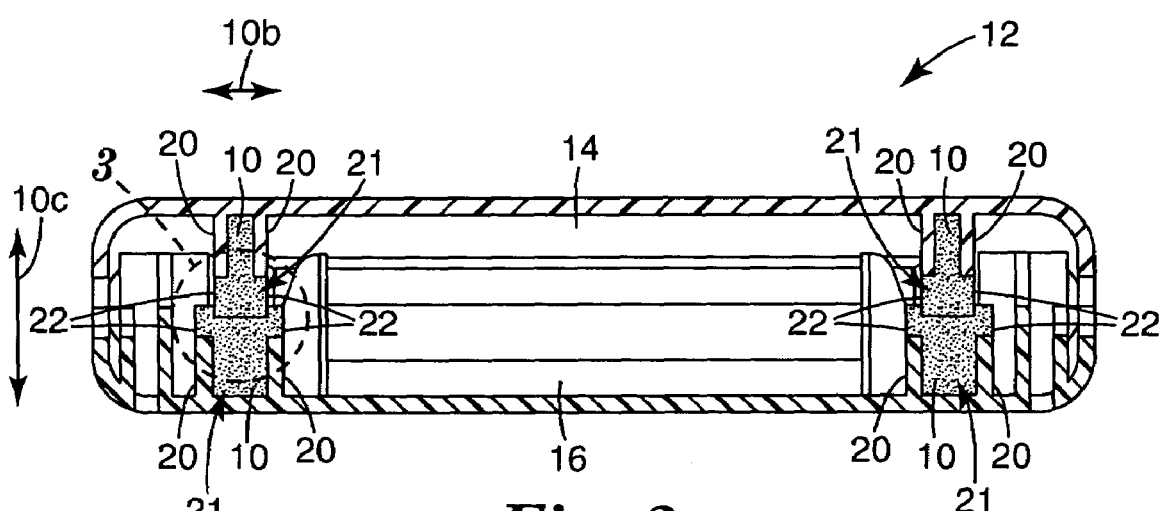
FIG. 2 is a sectional view taken along section 2—2 in FIG. 1.

When the cover members 14, 16 are placed against each other to form the cable box 12, exposed surfaces of the sealant materials 10 are compressed together to create seals of the cable box 12. This is best shown in FIG. 2, which is a sectional view taken along section 2—2 in FIG. 1. As illustrated, the sealant materials 10 are pressed together under compressive forces. This compressive relationship essentially eliminates the possibility of gaps existing where different sealant materials 10 confront each other. Alternatively stated, if the sealant materials 10 were simply in face-to-face contact, without any compressive force, gaps could exist where different sealing materials 10 confront each other. Such gaps, if present, could undesirably allow moisture to reach the internal portions of the cable box 12. The sealant materials 10, however, are pressed together by the action of closing of the cable box 12, which helps prevent such gaps from existing.

As depicted in FIG. 2, each sealant material 10 has a width in the direction of the vector 10b, and a depth in the direction of vector 10c. Each sealant material 10 has an end-surface area defined by the width 10b and the depth 10c of the particular sealant material 10, and a side-surface area defined by the length 10a and the depth 10c of the particular sealant material 10. As shown, the sealant materials 10 each have relatively small exposed-surface areas relative to the depths 10c of the sealant materials 10. This is in contrast to sealant materials that exhibit broad exposed-surface areas and short depths. Because of the small exposed-surface areas, the compressive forces applied to the sealant materials 10 by closure of the cable box 12 are distributed over small areas that increase the effective pressure applied per unit of the exposed surface area of the sealant materials 10. Such compressive forces are great enough to irreversibly deform conventional sealant materials over time.

Figure 3:
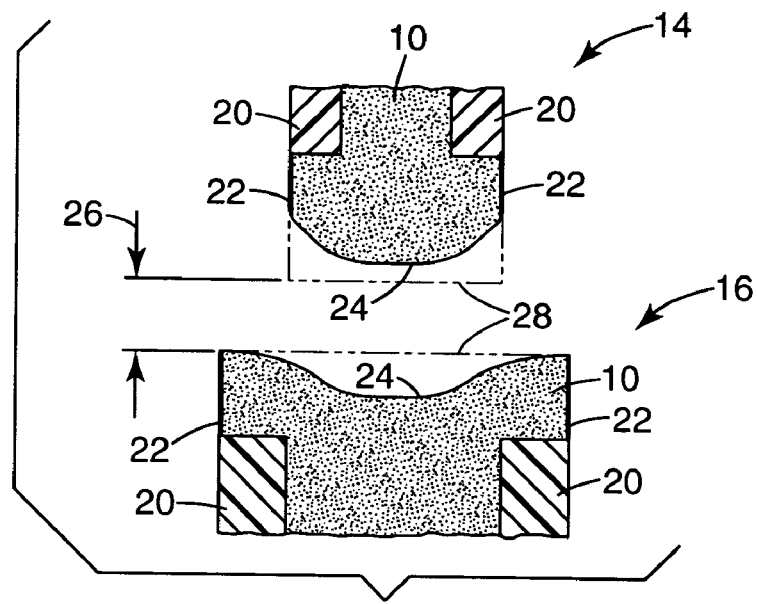
FIG. 3 is an expanded view of section 3 in FIG. 2.

Irreversible deformation prevents sealant materials from expanding back to original dimensions present prior to compressive force application. This concept is best demonstrated in FIG. 3, which is an expanded view of a partial section 3 in FIG. 2 after the cover members 14, 16 are separated from each other. Conventional sealant materials, after being subjected to compressive forces over time in the cable box 12, may become irreversibly and permanently deformed to have compressed surfaces 24 in the compressed states. However, the sealant materials 10 retain long-term elasticity and resist irreversible deformation. Upon separation of the cover members 14, 16, the sealant materials 10 expand back (illustrated by the arrows 26) to approximately the original dimensions with uncompressed surfaces 28. This ability to expand after separation of the cover members 14, 16 ensures that, once the sealant materials 10 are again compressed by the cover members 14, 16, effective sealing is obtainable over extended periods of time, despite opening and closing the cover members 14, 16. The sealant materials 10 further retain elasticity over multiple cycles of opening and closing the cover members 14, 16.

Figure 4:
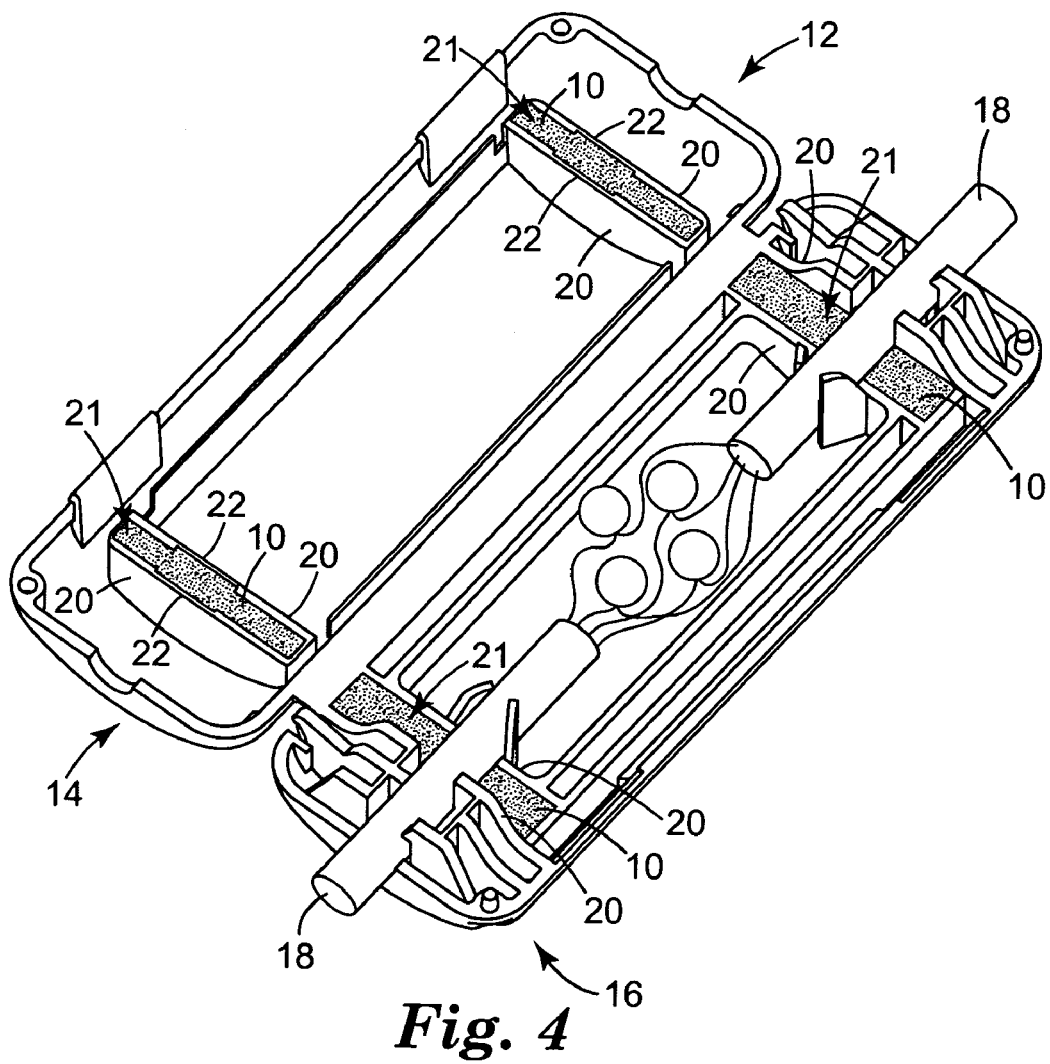
FIG. 4 is an perspective view of the sealant material in use with the cable box pursuant to an alternative use of the present invention.

Additionally, the sealant materials 10 may be used to provide seals around components that extend into or through the cable box 12. This situation is shown in FIG. 4, which is a perspective view of the cable box 12 of FIGS. 1 and 2 and further illustrates a spliced cable 18 that extends through the cable box 12. As depicted, the cable box 12 encloses the spliced cable 18. The cable box 12 is able to be re-opened to permit access to the internal portions of the cable box 12 when required and thereafter re-closed and resealed. The spliced cable 18 is a component that extends out from both distal ends of the cable box 12 and deforms the wall portions 22 that adjoin the containment cavities 21. The spliced cable 18, for example, may be a telecommunications cable, a power cable, or an optical fibre cable.

Internal portions of the cable box 12 may generally benefit from protection against the effects of the environment in which the cable box 12 is located and, more especially, may also benefit from protection against mechanical impact and the entry of moisture. Without use of the sealant material 10, the internal portions of the cable box 12 would be exposed to the atmosphere through small gaps around the spliced cable 18. Therefore, the sealant materials 10 are disposed within containment cavities 21 to provide seals that fully encompass the perimeter of the spliced cable 18.

As in FIGS. 1 and 2, when the cover members 14, 16 depicted in FIG. 4 are brought into contact with each other to form and close the cable box 12, the exposed surfaces areas of different sealant materials 10 are compressed together. However, proximate the spliced cable 18 (i.e., around the wall portions 22), the sealant materials 10 are compressed to an even greater extent due to the presence of the spliced cable 18 and engagement of exposed surface areas of the sealant materials 10 against the spliced cable 18. The sealant materials 10 exhibit good mechanical properties and long-term elasticity retention and provide effective seals over extended periods of time proximate the spliced cable 18.

As illustrated in FIGS. 1–4, the cable box 12 is a re-enterable enclosable container that provides protection to a cable splice against mechanical impact and the entry of moisture and does not require complete filling of the internal portions of the cable box 12 with the sealant material 10. The sealant materials 10 may be disposed only at the distal ends of the cover members 14, 16 in the containment cavities 21. This is beneficial for limiting the amount of the sealant material 10 that is used. However, it also subjects the sealant materials 10 to concentrated compressive forces due to the limited nature of the exposed-surface areas defined by the lengths 10a and the widths 10b. The sealant materials 10 exhibit good mechanical properties and long-term elasticity retention, and provide effective seals over extended periods of time with use in the cable box 12.

Suitable Chemicals for Sealant Material

Examples of suitable silicone oils include low viscosity organopolysiloxanes, with the average formula:

$$R_xSiO_{(4-x)/2},$$

where "x" may range from about 1.5 to about 2.8, and "R" may be one or more organic radicals. Suitable organic radicals for "R" include alkyl radicals, (e.g., methyl, ethyl, propyl, butyl, pentyl, hexyl, heptyl, octyl, nonyl, decyl, dodecyl, and octadecyl), alkenyl radicals (e.g., vinyl and allyl), cycloalkyl radicals (e.g., cyclobutyl, cyclopentyl, cyclohexyl, cycloheptyl), aryl radicals (e.g., phenyl, diphenyl, naphthyl, anthryl, and phenanthryl), alkaryl radicals (e.g., tolyl, xylyl, and ethylphenyl), and aralkyl radicals (e.g., benzyl, α-phenylethyl, and β-phenylethyl). Dimethylpolysiloxane is an example of a particularly suitable organopolysiloxane.

Examples of suitable vinyl siloxanes include vinyl-containing organopolysiloxanes, such as vinyl-terminated polydimethylsiloxane and polydimethylsiloxane containing non-terminating vinyl radicals. Vinyl-terminated polydimethylsiloxane is an example of a particularly suitable vinyl siloxane.

Examples of suitable hydrosiloxanes include linear, cyclic, and branched organohydrogenpolysiloxanes, and copolymers thereof. Such examples include methylhydrogencyclopolysiloxane, methylhydrogensiloxane-dimethylsiloxane copolymers, methylhydrogensiloxane-diphenylsiloxane copolymers, and methylhydrogensiloxane-diphenylsiloxane-dimethylsiloxane copolymers (including trimethylsiloxy-terminated, dimethylhydrogensiloxy-terminated radicals). Methylhydrogensiloxane-dimethylsiloxane copolymer is an example of a particularly suitable hydrosiloxane.

The catalyst used for curing the sealant material 10 is an addition cure catalyst. Examples of suitable additional cure catalysts include platinum-based catalysts such as a platinum black, platinic chloride, platinum divinyltetramethylsiloxane complex in xylene, and derivatives thereof. Derivatives of the platinum catalysts include residual compositions of the platinum catalysts as a result of the curing of the sealant material 10.

Examples of suitable reaction inhibitors include 1,3,5,7-tetravinyl-1,3,5,7-tetramethylcyclotetrasiloxanes.

The microsphere fillers used with the sealant material 10 are characterized as being soft skinned, closed cell, and expanded. Examples of suitable microsphere fillers include thermoplastic microsphere fillers of trade designation "Expancel 091 DE 40 d30", commercially available from Expancel, Sundsvall, Sweden. Suitable particle sizes for the microsphere fillers include about 1 to about 100 micrometers, more particularly about 20 to about 60 micrometers.

Examples of suitable silica filler include precipitated silica, fumed silica, and fired silica, and hydrophobized derivatives thereof. Examples of suitable hydrophobic fumed silica include silicas of trade designation Aerosil R104 (after-treated with octamethylcyclotetrasiloxane), Aerosil R106 (after-treated with octamethylcyclotetrasiloxane), Aerosil R202 (after-treated with polydimethylsiloxane), Aerosil R812 (after-treated with hexamethyldisilizane), and Aerosil R8200 (after-treated with hexamethyldisilizane), all commercially available from Degussa, Venissieux, France. Suitable surface areas for the silica fillers include about 50 to about 500 meters$^2$/gram (m$^2$/g), more particularly about 100 to about 200 m$^2$/g.

Property Analysis and Characterization Procedures

Various analytical techniques are available for characterizing the sealant materials of the present invention. Several of the analytical techniques are employed herein. An explanation of these analytical techniques follows.

Compressive Aging Elasticity Test

The levels of elasticity, defined by the ratio $R_x$, were quantitatively determined for various sealant materials in accordance the following procedure. Each sealant material was poured into a plastic container, and thereupon allowed to addition cure without external heating. The plastic container used was a housing top portion of an automotive CMC connector body, model 48 ways, available from Molex, Inc., Lisle, Ill. The quantity of the sealant material was adjusted so that the cured sealant material was 5.5 millimeters (mm) thick.

After curing, an initial compression measurement was performed on the sealant material in the plastic container. A force transducer (TA500 Test Analyzer, commercially available from Lloyd Instruments SA, Montigny le Bretonneux, France) with a 10 Newton load cell was used to measure the compression force. The recorded compression force corresponded to the force required to compress from the initial 5.5 mm thickness to a thickness of 3.6 mm.

After the initial compression measurement, the sealant material was covered and compressed by a cover until the sealant material reached a thickness of 3.6 mm. The cover used was the corresponding rear seal cover of the automotive CMC connector body for the plastic container. The sealant material was then subjected to compressive aging at either 20° C., 60° C., or 90° C. The 20° C. and 60° C. temperatures corresponded to using the s materials with enclosable containers within real-world environments. The 90° C. temperature corresponded to using the sealant materials with enclosable containers at an accelerated aging temperature.

At various times during the compressive aging, the cover was removed. The sealant material was then allowed to sit uncovered and uncompressed in the plastic container for one hour. After the one hour time period, a compression measurement of the sealant material was again performed and recorded, as described above. After the measurement was performed, the sealant material was again covered and compressed down until the sealant material reached a thickness of 3.6 mm. Compressive aging at the corresponding temperature was then continued.

For a sealant material x, the ratio $R_x$ (i.e., the percentage of elasticity retained) was calculated using the following formula:

$$R_x(t) = \frac{100[F(t) - F(t=0)]}{F(t=0)}$$

where "t" was the time in days of aging and "F(t)" was the compression force in Newtons at time "t" (e.g., F(t=0) was the compression force of the initial compression measurement). The resulting ratios $R_x$ were then quantitatively compared.

Hardness, Tack, and Stress Relaxation Test

The hardness, tack, and stress relaxation of the sealant materials were quantitatively determined with a Texture Analyzer XT2, commercially available from Texture Technologies, Algonquin, Ill. The Texture Analyzer XT2 included a 5-gram trigger and a ¼-inch (0.635-centimeter) ball probe. The sample of the sealant material used was stacked by tensile ends for a thickness of 12 millimeters (mm). Alternatively, the samples may have been stacked by dog-bone sides to obtain the 12 mm thickness. During a test cycle, the probe was inserted into the sample of the sealant material at 1.0 mm/sec to a depth of 2.0 mm. The force required to reach the 2.0 mm depth was recorded as the peak compressive force. The probe was then held at the 2.0 mm depth for a 60 second period before an additional force measurement was recorded as the final force. After the final force measurement, the probe was then withdrawn. The force required to withdraw the probe was recorded as the peak tensile force.

For each sealant material tested, the hardness, tack, and stress relaxation of the sealant material were calculated using the following formulas:

Hardness (g)=Peak Compressive Force

Tack (g)=Peak Tensile Force $$\text{Stress Relaxation (\%)} = \frac{100 \times (PeakCompressiveForce - FinalForce)}{(PeakCompressiveForce)}$$

where the peak compressive force, peak tensile force, and final force are all measured by weight in grams with the ¼-inch (0.635-centimeter) ball probe.

Tensile Strength Test

The physical strengths of the sealant materials were quantitatively determined, pursuant to American Society for Testing and Materials, Conshohocken, Pa., (ASTM) D-412, to determine the extent of compressive forces the sealant materials may endure. The tensile strength properties may include the maximum load, displacement at maximum load, stress at maximum load, maximum strain, displacement at automatic break, load at automatic break, and stress at automatic break. The testing may be performed on a Series IX Automated Materials Testing System 1.00, commercially available from Instron Corp., Canton, Mass., with a crosshead speed of 50.80 centimeters/minute and a full-scale load of 10.197 kilograms (kg). Environmental conditions for the testing include a temperature of 23° C. and a relative humidity of 50%.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

The following compositional abbreviations are used in the following Examples:

"Silicone oil": A polydimethylsiloxane oil commercially available from GE Bayer Silicones, Bolton, United Kingdom, under the trade designation "Oil M 100".

"Vinyl siloxane": A vinyl-terminated polydimethylsiloxane commercially available from GE Bayer Silicones, Bolton, United Kingdom, under the trade designation "Silopren U 65".

"Hydrosiloxane": A methylhydrogensiloxane-dimethylsiloxane copolymer commercially available from Gelest, Inc. Tullytown, Pa., under the trade designation "HMS 301R".

"Platinum catalyst": A platinum divinyltetramethylsiloxane complex in xylene commercially available from Gelest, Inc. Tullytown, Pa., under the trade designation "SIP6831.0".

"Reaction inhibitor": A 1,3,5,7-tetravinyl-1,3,5,7-tetramethylcyclotetrasiloxane commercially available from Gelest, Inc. Tullytown, Pa., under the trade designation "SIT7900.0".

"Microsphere filler": A thermoplastic microsphere filler commercially available from Expancel, Sundsvall, Sweden, under the trade designation "Expancel 091 DE 40 d30".

"Silica filler": A hydrophobic fumed silica commercially available from Degussa, Venissieux, France, under the trade designation "Aerosil R8200".

Comparative Example 1

Comparative Example 1 concerns a sealant material consisting of a silicone gel, without any added microsphere filler and without any added silica filler. The silicone gel is a mixture of the silicone oil, vinyl siloxane, hydrosiloxane, platinum catalyst, and reaction inhibitor. Table 1 provides the component concentrations for the sealant material of Comparative Example 1. The components were mixed into a two-part system (Parts A and B). The silicone oil and vinyl siloxane were added in equal amounts to Parts A and B. The platinum catalyst and reaction inhibitor were then mixed into Part A, and the hydrosiloxane was mixed into Part B. Parts A and B were then mixed together in one-to-one ratio to addition cure the sealant material at room temperature.

TABLE 1

| Components | Percent by Weight |
| --- | --- |
| Silicone Oil | 62.0 |
| Vinyl Siloxane | 33.0 |
| Hydrosiloxane | 5.0 |
| Platinum Catalyst | * |
| Reaction Inhibitor | ** |
| Microsphere Filler | 0.0 |
| Silica Filler | 0.0 |

* The platinum catalyst concentration was 3.5 ppm by weight of the sealant material.
** The reaction inhibitor concentration was 15 ppm by weight of the sealant material.

Comparative Example 2

Comparative Example 2 concerns a sealant material consisting of 95% silicone gel (as described in Comparative Example 1) that additionally includes 5.0% silica filler (but does not include any microsphere filler). Prior to curing, the silica filler was equally distributed between and mixed into Parts A and B of the two-part system. Parts A and B were then mixed together in one-to-one ratio to addition cure the sealant material at room temperature. Table 2 provides the component concentrations for the sealant material of Comparative Example 2.

TABLE 2

| Components | Percent by Weight |
| --- | --- |
| Silicone Oil | 58.9 |
| Vinyl Siloxane | 31.4 |
| Hydrosiloxane | 4.8 |
| Platinum Catalyst | * |

TABLE 2-continued

| Components | Percent by Weight |
| --- | --- |
| Reaction Inhibitor | ** |
| Microsphere Filler | 0.0 |
| Silica Filler | 5.0 |

* The platinum catalyst concentration was 3.5 ppm by weight of the sealant material.
** The reaction inhibitor concentration was 15 ppm by weight of the sealant material.

Example 1

Example 1 concerns a sealant material described in the first embodiment of the present invention, and consists of 98% silicone gel (as described Comparative Example 1) that additionally includes 2.0% microsphere filler (but does not include any silica filler). Prior to curing, the microsphere filler was equally distributed between and mixed into Parts A and B of the two-part system. Parts A and B were then mixed together in one-to-one ratio to addition cure the sealant material at room temperature. Table 3 provides the component concentrations for the sealant material of Example 1.

TABLE 3

| Components | Percent by Weight |
| --- | --- |
| Silicone Oil | 60.8 |
| Vinyl Siloxane | 32.3 |
| Hydrosiloxane | 4.9 |
| Platinum Catalyst | * |
| Reaction Inhibitor | ** |
| Microsphere Filler | 2.0 |
| Silica Filler | 0.0 |

* The platinum catalyst concentration was 3.5 ppm by weight of the sealant material.
** The reaction inhibitor concentration was 15 ppm by weight of the sealant material.

Example 2

Example 2 concerns a sealant material described in the second embodiment of the present invention, and consists of 93% silicone gel (as described in Comparative Example 1) that additionally includes 2.0% microsphere filler and 5.0% silica filler. Prior to curing, the microsphere filler and the silica filler were equally distributed between and mixed into Parts A and B of the two-part system. Parts A and B were then mixed together in one-to-one ratio to addition cure the sealant material at room temperature. Table 4 provides the component concentrations for the sealant material of Example 2.

TABLE 4

| Components | Percent by Weight |
| --- | --- |
| Silicone Oil | 57.7 |
| Vinyl Siloxane | 30.7 |
| Hydrosiloxane | 4.7 |
| Platinum Catalyst | * |
| Reaction Inhibitor | ** |
| Microsphere Filler | 2.0 |
| Silica Filler | 5.0 |

* The platinum catalyst concentration was 3.5 ppm by weight of the sealant material.
** The reaction inhibitor concentration was 15 ppm by weight of the sealant material.

Elasticity Testing for Examples 1 and 2 and Comparative Examples 1 and 2

The sealant materials of Examples 1 and 2 and Comparative Examples 1 and 2 were subjected to compressive aging pursuant to the "Compressive Aging Elasticity Test" method described above. Tables 5–7 provide initial and post-aging values of the ratio $R_x(\%)$ for the sealant materials of Examples 1 and 2 and Comparatives Examples 1 and 2, for 20° C., 60° C., and 90° C. aging, respectively.

TABLE 5

| Time of Compressive Aging at 20° C. (days) | Example 1 (%) | Example 2 (%) | Comparative Example 1 (%) | Comparative Example 2 (%) |
|---|---|---|---|---|
| 0 | 0 | 0 | 0 | 0 |
| 2 | −10 | −16 | 1 | −9 |
| 7 | −13 | −20 | −1 | −17 |
| 10 | −10 | −17 | −1 | −15 |
| 17 | −16 | −22 | −12 | −21 |
| 43 | −18 | −24 | −20 | −28 |
| 64 | −25 | −27 | −26 | −33 |
| 93 | −25 | −27 | −31 | −37 |

TABLE 6

| Time of Compressive Aging at 60° C. (days) | Example 1 (%) | Example 2 (%) | Comparative Example 1 (%) | Comparative Example 2 (%) |
|---|---|---|---|---|
| 0 | 0 | 0 | 0 | 0 |
| 2 | −7 | −12 | −3 | −12 |
| 7 | −18 | −23 | −17 | −31 |
| 10 | −24 | −27 | −23 | −36 |
| 17 | −23 | −28 | −27 | −39 |
| 43 | −26 | −31 | −42 | −48 |
| 64 | −29 | −34 | −44 | −51 |
| 93 | −26 | −29 | −44 | −51 |

TABLE 7

| Time of Compressive Aging at 90° C. (days) | Example 1 (%) | Example 2 (%) | Comparative Example 1 (%) | Comparative Example 2 (%) |
|---|---|---|---|---|
| 0 | 0 | 0 | 0 | 0 |
| 2 | −22 | −23 | −17 | −28 |
| 7 | −28 | −34 | −30 | −44 |
| 10 | −33 | −40 | −37 | −53 |
| 17 | −37 | −45 | −41 | −60 |
| 43 | −40 | −48 | −55 | −72 |
| 64 | −43 | −49 | −59 | −80 |

The data provided in Tables 5–7 illustrate the benefits of incorporating the microsphere filler into the sealant material. It is first observed that the sealant material of Example 1, which incorporates the microsphere filler, exhibits greater elasticity after compressive aging than the sealant material of Comparative Example 1, which does not include any filler material. In particular, the sealant material of Example 1 exhibits greater elasticity than the sealant material of Comparative Example 1 after about 43 days at 20° C. after about 17 days at 60° C., and after only about 7 days at 90° C. This again is believed to be attributable to the flexibility of the microsphere filler.

The benefit of incorporating the microsphere filler is further observed when comparing the sealant material of Example 2, which incorporates both the microsphere filler and the silica filler, and the sealant material of Comparative Example 2, which incorporates only the silica filler. As provided in Tables 5–7, the sealant material of Example 2 exhibits greater elasticity retention than the sealant material of Comparative Example 2 after about 43 days at 20° C., and almost immediately at 60° C. and 90° C.

On a side note, when comparing the sealant materials of Comparative Examples 1 and 2, the negative effect on elasticity by adding silica filler becomes quickly apparent at all of the compressive aging temperatures. Nonetheless, the addition of the microsphere filler, as in the sealant material of Example 2, counters the negative effect on ° elasticity. In fact, after about 70 days at 20° C., and about 20–30 days at 60° C. and at 90sealant material of Example 2 exhibits greater elasticity than the sealant material of Comparative Example 1. The addition of the microsphere filler not only counters the negative effect of the silica filler, but further enhances the elasticity relative to the unfilled silicone gel.

Another observation is that the changes in elasticity of the sealant materials of Examples 1 and 2 level out more rapidly than the changes in elasticity of the sealant materials of Comparative Examples 1 and 2. After an initial drop in elasticity, subsequent changes in elasticity of the sealant materials of Examples 1 and 2 are small. This effect is most noticeable in the 60° C. compressive aging data provided in Table 6. After about 10 days of aging at 60° C., the sealant materials of Examples 1 and 2 exhibit only minimal changes in elasticity. In contrast, the sealant materials of Comparative Examples 1 and 2 continue to exhibit significant drops in elasticity until about 43 days. This again, is believed to be attributable to the addition of the microsphere filler.

Examples 3–6

Examples 3–6 concern four sealant materials of the same composition, as described in the first embodiment of the present invention. Each of Examples 3–6 consist of a silicone gel and a microsphere filler. The silicone gel is a mixture of the silicone oil, vinyl siloxane, hydrosiloxane, platinum catalyst, and reaction inhibitor. The components of the silicone gel and the microsphere filler were mixed into a two-part system (Parts A and B) in concentrations provided in Table 8.

TABLE 8

| Components | Part A (Percent by Weight) | Part B (Percent by Weight) |
|---|---|---|
| Silicone oil | 83.9 | 81.2 |
| Vinyl Siloxane | 14.1 | 14.0 |
| Hydrosiloxane | 0.0 | 2.8 |
| Platinum Catalyst | * | 0.0 |
| Reaction Inhibitor | ** | 0.0 |
| Microsphere Filler | 2.0 | 2.0 |

* The platinum catalyst concentration was 7 ppm by weight of Part A.
** The reaction inhibitor concentration was 30 ppm by weight of Part A.

Parts A and B were then mixed together in one-to-one ratio to addition cure the sealant material at room temperature. This method was used for each sealant material of Examples 3–6. Table 9 provides the component concentrations for the sealant materials of Examples 3–6.

TABLE 9

| Components | Percent by Weight |
| --- | --- |
| Silicone oil | 82.6 |
| Vinyl Siloxane | 14.0 |
| Hydrosiloxane | 1.4 |
| Platinum Catalyst | * |
| Reaction Inhibitor | ** |
| Microsphere Filler | 2.0 |

* The platinum catalyst concentration was 3.5 ppm by weight of the sealant material (i.e., 7 ppm by weight of Part A).
** The reaction inhibitor concentration was 15 ppm by weight of the sealant material (i.e., 30 ppm by weight of Part A).

Hardness, Tack, and Stress Relaxation Testing for Examples 3–6

The sealant materials of Examples 3–6 were subjected to testing pursuant to the "Hardness, Tack, and Stress Relaxation Test" method described above. Table 10 provides the hardness, tack, and stress relaxation values for the sealant material of Examples 3–6.

TABLE 10

| Force Tested | Example 3 | Example 4 | Example 5 | Example 6 |
| --- | --- | --- | --- | --- |
| Hardness (g) | 76.6 | 79.8 | 96.5 | 100.3 |
| Tack (g) | −1.9 | −1.7 | −1.4 | −1.0 |
| Stress Relaxation (%) | 25.6 | 24.8 | 25.5 | 25.1 |
| Final Force (g) | 57.0 | 60.0 | 71.8 | 75.1 |

The data provided in Table 10 illustrates the good mechanical properties of the sealant materials of Examples 3–6. The hardness of a sealant material is the resistance against deformation the sealant material exhibits when a compressive force is applied. This corresponds to the amount of compressive force required to close the enclosable container 12 against the sealant material 10 located in the containment cavities 21. The sealant materials of Examples 3–6, which again are compositionally the same and incorporate the microsphere filler, exhibit a hardness ranging from about 76–100 grams when tested according to the above-described method. The disparity in hardness values are believed to be due to dispersement variations of the microsphere filler in the sealant materials.

The tack of a sealant material is the adhesive retention exhibited to an object withdrawing from contact with the sealant material. When a sealant material is used with the enclosable container 12, a level of tack helps to hold the enclosable container 12 closed. The sealant materials of Examples 3–6 exhibit a tack ranging from 1.0–1.9 grams. The negative values for tack denote the withdrawing force, as opposed to the compressive force of hardness. The range of tack exhibited by the sealant materials of Examples 3–6 provide a moderate level of adhesive retention. At the same time, the values are not so great that the sealant materials of Examples 3–6 effectively adhesively seal an enclosable container closed.

Stress relation is an additional measurement of the elasticity of a sealant material, and corresponds to resistance against permanent deformation and the amount of expansion the sealant material exhibits after being subjected to a compressive force. The data in Table 10 provides a stress relaxation for the sealant material of Examples 3–6 of about 25%. The addition of the microsphere filler increases the resistance of the sealant materials of Examples 3–6 against permanent deformation. This is further observed by comparing the final force values to the peak compressive force values. After the 60 second period, the sealant materials of Examples 3–6 exhibit significantly less resistance to a compressive force.

Tensile Strength Testing for Examples 3–6

The sealant materials of Examples 3–6 were subjected to physical strength testing pursuant to the "Tensile Strength Test" method described above. Table 11 provides the tensile strength testing values for the sealant material of Examples 3–6.

TABLE 11

| Tensile Strength Properties | Example 3 | Example 4 | Example 5 | Example 6 |
| --- | --- | --- | --- | --- |
| Maximum Load (g) | 188.7 | 185.5 | 179.2 | 184.6 |
| Displacement at Maximum Load (cm) | 26.42 | 29.55 | 30.48 | 27.77 |
| Stress at Maximum Load (kPa) | 52.99 | 54.10 | 61.47 | 64.74 |
| Maximum strain (%) | 304.8 | 338.1 | 348.6 | 316.2 |
| Displacement at automatic break (cm) | 26.42 | 29.55 | 30.48 | 27.77 |
| Load at automatic break (g) | 188.7 | 185.5 | 179.2 | 184.6 |
| Stress at automatic break (kPa) | 52.99 | 54.10 | 61.47 | 64.74 |

The data provided in Table 11 further illustrates the good mechanical properties of the sealant materials of Examples 3–6. With the incorporation of the microsphere filler, the sealant materials of Examples 3–6 are capable of withstanding a load of about 179–189 grams and a displacement of about 26–30 cm. With the addition of the microsphere filler, the sealant materials 10 of the present invention are capable of withstanding the compressive forces imposed by the enclosable container 12.

Although the present invention has been described with reference to preferred embodiments, workers skilled in the art will recognize that changes may be made in form and detail without departing from the spirit and scope of the invention.

The invention claimed is:

1. A method of sealing an enclosable container, the method comprising:
   positioning a sealant material within the enclosable container, wherein the sealant material is present within less than the entire interior of the container and wherein the sealant material comprises a silicone gel and a microsphere filler distributed within the silicone gel; and
   closing the enclosable container to compress the sealant material, wherein the sealant material comprises a first portion and second portion, and wherein closure of the enclosable container compresses the first portion against the second portion;
   wherein the first portion and the second portion each have an exposed-surface area and a side-surface area, wherein the exposed-surface area is smaller than the side-surface area, and wherein the exposed-surface area of the first portion contacts the exposed-surface area of the second portion.

2. The method of claim 1, wherein the silicone gel comprises:
   about 60.0% to about 85.0% by weight of the silicone gel of an organopolysiloxane;
   about 10.0% to about 40.0% by weight of the silicone gel of a vinyl siloxane; and about 0.5% to about 6.0% by weight of the silicone gel of a hydrosiloxane.

3. The method of claim 2, wherein the silicone gel further comprises a platinum catalyst, or a derivative thereof.

4. The method of claim 1, wherein the microsphere filler comprises an expanded thermoplastic microsphere filler.

5. The method of claim 4, wherein the microsphere filler constitutes about 0.5% to about 10.0% by weight of the sealant material.

6. The method of claim 1 wherein the sealant material further comprises a silica filler.

7. The method of claim 6, wherein the silica filler constitutes about 1.0% to about 20.0% by weight of the sealant material.

8. The method of claim 6, wherein the silicone gel comprises:
about 60.0% to about 85.0% by weight of the silicone gel of an organopolysiloxane;
about 10.0% to about 40.0% by weight of the silicone gel of a vinyl siloxane; and
about 0.5% to about 10.0% by weight of the silicone gel of a hydrosiloxane.

9. The method of claim 8, wherein the silicone gel further comprises a platinum catalyst, or a derivative thereof.

10. The method of claim 6, wherein the microsphere filler comprises an expanded thermoplastic microsphere filler.

11. The method of claim 10, wherein the microsphere filler constitutes about 0.5% to about 10.0% by weight of the sealant material and the silica filler constitutes about 1.0% to about 20.0% by weight of the sealant material.

12. The method of claim 1, wherein at least one of the first and second portions of the sealant material is pre-molded to create a pre-shaped piece prior to the positioning of the sealant material within the enclosable container.

13. The method of claim 1, wherein the sealant material has a tack ranging from 1.0 to 1.9 grams.

14. A method of sealing an enclosable container having a component extending into the enclosable container, the method comprising:
positioning a sealant material within the enclosable container and adjacent to the component, wherein the sealant material comprises a silicone gel and a microsphere filler and wherein the sealant material is present within less than the entire interior of the container; and
closing the enclosable container to compress the sealant material around the component;
wherein the sealant material comprises a first portion and second portion, and wherein closure of the enclosable container compresses the first portion against the second portion around the component; and
wherein first portion and the second portion each have an exposed-surface area and a side-surface area, wherein the exposed-surface area is smaller than the side-surface area, and wherein the exposed-surface area of the first portion contacts the exposed-surface area of the second portion.

15. The method of claim 14, wherein the component comprises a cable.

16. The method of claim 14, wherein the silicone gel comprises:
about 60.0% to about 85.0% by weight of the silicone gel of an organopolysiloxane;
about 10.0% to about 40.0% by weight of the silicone gel of a vinyl siloxane; and
about 0.5% to about 10.0% by weight of the silicone gel of a hydrosiloxane.

17. The method of claim 14, wherein the microsphere filler constitutes about 0.5% to about 10.0% by weight of the sealant material.

18. The method of claim 14, wherein the sealant material further comprises a silica filler.

19. The method of claim 18, wherein the silicone gel comprises:
about 60.0% to about 85.0% by weight of the silicone gel of an organopolysiloxane;
about 10.0% to about 40.0% by weight of the silicone gel of a vinyl siloxane; and
about 0.5% to about 10.0% by weight of the silicone gel of a hydrosiloxane.

20. The method of claim 18, wherein the microsphere filler constitutes about 0.5% to about 10.0% by weight of the sealant material and the silica filler constitutes about 1.0% to about 20.0% by weight of the sealant material.

21. A sealable device comprising:
a container capable of being closed to define an interior portion;
a sealant material disposed within the interior portion, wherein the sealant material comprises a silicone gel and a microsphere filler, wherein the sealant material is present within less than the entire interior of the container and wherein closure of the container is effective to compress the sealant material and seal the container, wherein the container comprises a pair of cover members adapted to fold together to close the container;
wherein the sealant material comprises a first portion and second portion, and wherein closure of the container is effective to compress the first portion against the second portion; and
wherein the first portion and the second portion each have an exposed-surface area and a side-surface area, wherein the exposed-surface area is smaller than the side-surface area, and wherein the exposed-surface area of the first portion contacts the exposed-surface area of the second portion.

22. The sealable device of claim 21, wherein the sealable device is adapted to receive a component that extends within the sealable device.

23. The sealable device of claim 22, wherein the sealant material provides a seal adjacent to the component.

24. The sealable device of claim 21, wherein the silicone gel comprises:
about 60.0% to about 85.0% by weight of the silicone gel of an organopolysiloxane;
about 10.0% to about 40.0% by weight of the silicone gel of a vinyl siloxane; and
about 0.5% to about 10.0% by weight of the silicone gel of a hydrosiloxane.

25. The sealable device of claim 24, wherein the sealant material further comprises a silica filler.

26. The sealable device of claim 25, wherein the microsphere filler constitutes about 0.5% to about 10.0% by weight of the sealant material and the silica filler constitutes about 1.0% to about 20.0% by weight of the sealant material.

* * * * *

UNITED STATES PATENT AND TRADEMARK OFFICE
CERTIFICATE OF CORRECTION

PATENT NO. : 7,214,735 B2  Page 1 of 1
APPLICATION NO. : 10/770095
DATED : May 8, 2007
INVENTOR(S) : Carole Jego Stora It is certified that error appears in the above-identified patent and that said Letters Patent is hereby corrected as shown below:

Column 7,
Line 27, delete "s" and insert --sealant-- therefor.

Column 12,
Line 13, after "effect on" delete "°".

Column 12,
Line 15, delete "90sealant" and insert --90°C, the sealant-- therefor.

Signed and Sealed this

First Day of January, 2008

JON W. DUDAS
*Director of the United States Patent and Trademark Office*